(No Model.)
B. CLARK.
HARROW FOR CULTIVATING LISTED CORN.
No. 293,227. Patented Feb. 12, 1884.
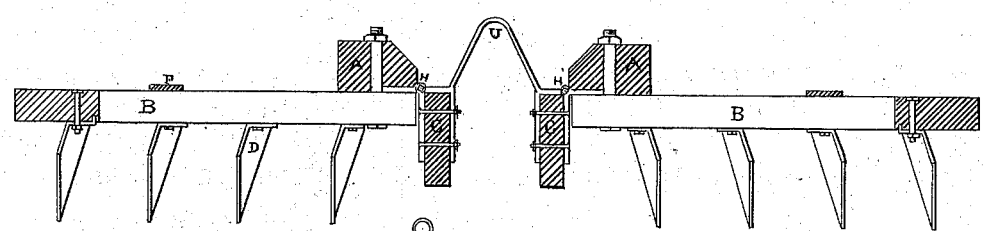
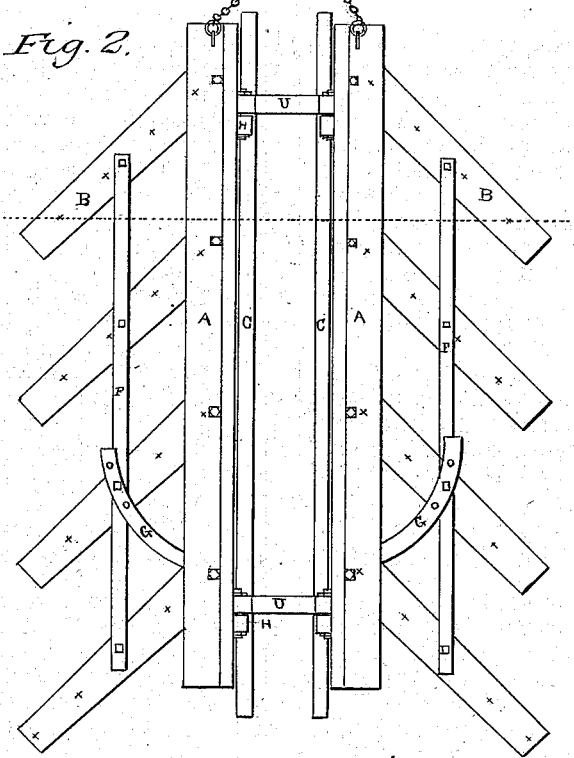
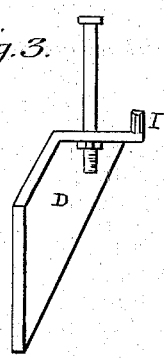
WITNESSES:
Orvis E. Strong
M. Staughton
INVENTOR:
Byron Clark, by
A. Roberts.
Attorney.

UNITED STATES PATENT OFFICE.

BYRON CLARK, OF GREENWOOD, NEBRASKA, ASSIGNOR OF ONE-HALF TO OBIDIAH HULL, OF SAME PLACE.

HARROW FOR CULTIVATING LISTED CORN.

SPECIFICATION forming part of Letters Patent No. 293,227, dated February 12, 1884.

Application filed July 7, 1883. (No model.)

*To all whom it may concern:*

Be it known that I, BYRON CLARK, of Greenwood, in the county of Lancaster and State of Nebraska, have invented certain new and useful Improvements in Harrows for Cultivating Listed Corn; and I do hereby declare that the following is a full, clear, and exact description of the invention, which will enable others skilled in the art to which it pertains to make and use the same, reference being had to the accompanying drawings, and to the letters of reference marked thereon, which form a part of this specification.

The object of my invention is to produce a harrow especially adapted to the cultivation of corn that has been planted with a lister, and is consequently growing in the middle of a rather deep furrow, where it is quite liable to be covered in harrowing.

In the drawings, Figure 1 is a cross-section, Fig. 2 a plan, and Fig. 3 a detail, of my invention.

In my improved harrow the frames, consisting of the beams A A and bars B B, to which the teeth D are attached, are secured by hinges to the runners C C, which are fixed to each other like a sled by means of the arches U U, the object of the runners being to guide the implement and protect the corn from clods or earth. The two wings of the frame A A B B, being thus hinged, will allow the teeth to operate on the sides of the furrow, gradually filling it, while the corn is protected.

In use the draft is so adjusted as to bring a portion of the weight on the runners, so as to keep them close to the ground. The arch U connects the runners C and keeps the wings from being thrown over too far. The bars B are connected by bars of iron F, and held in place by the adjusting-bars G G, by means of which the width of the harrow may be increased or diminished at pleasure.

The runners C C may be set lower by changing the bolts, securing them to the arches U U, which adjustment is desirable in going over a field the second or third time, when the furrows will have been partly filled.

The teeth D are forged from flat bars of steel, sheared to a point on the back side, while the front is straight and sharpened and set inclining backward. The plane of the tooth is also inclined to the line of draft and held in that position by the projecting dowel I, the angle of inclination being readily adjustable by having two or more holes to receive the dowel.

I claim—

In combination with the runners C C, connected by arches U U, the harrow frames or wings A B, hinged to said runners, as shown, substantially as and for the purpose set forth.

In testimony that I claim the foregoing as my own I affix my signature in presence of two witnesses.

BYRON CLARK.

Witnesses:
ARTEMAS ROBERTS,
ORVIS E. STRONG.